United States Patent
Itadani (10) Patent No.: US 9,845,886 B2
(45) Date of Patent: Dec. 19, 2017

(54) SLIDING PARTS

(71) Applicant: EAGLE INDUSTRY CO., LTD., Tokyo (JP)

(72) Inventor: Masatoshi Itadani, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 42 days.

(21) Appl. No.: 15/100,223

(22) PCT Filed: Dec. 5, 2014

(86) PCT No.: PCT/JP2014/082246
§ 371 (c)(1),
(2) Date: May 27, 2016

(87) PCT Pub. No.: WO2015/087799
PCT Pub. Date: Jun. 18, 2015

(65) Prior Publication Data
US 2017/0002929 A1  Jan. 5, 2017

(30) Foreign Application Priority Data

Dec. 9, 2013 (JP) .................................. 2013-254432

(51) Int. Cl.
| | |
|---|---|
| F16J 15/00 | (2006.01) |
| F16J 15/34 | (2006.01) |
| F16C 33/72 | (2006.01) |
| F16C 17/04 | (2006.01) |

(52) U.S. Cl.
CPC ......... *F16J 15/3412* (2013.01); *F16C 17/045* (2013.01); *F16C 33/72* (2013.01)

(58) Field of Classification Search
CPC .. F16J 15/34; F16J 15/72; F16J 15/162; F16J 15/3412; F16J 15/3424

USPC ............... 277/400, 500, 306, 348, 352, 358
See application file for complete search history.

(56) References Cited

U.S. PATENT DOCUMENTS

| | | | | |
|---|---|---|---|---|
| 5,498,007 A | * | 3/1996 | Kulkarni | F16J 15/3412 277/366 |
| 5,501,470 A | | 3/1996 | Fuse et al. | 277/96.1 |
| 6,446,976 B1 | | 9/2002 | Key et al. | 277/367 |
| 7,744,094 B2 | | 6/2010 | Yanagisawa et al. | 277/399 |
| 9,151,389 B2 | | 10/2015 | Itadani | F16J 15/342 |

(Continued)

FOREIGN PATENT DOCUMENTS

| | | | |
|---|---|---|---|
| CN | 1215135 | 4/1999 | ............. F16J 15/54 |
| CN | 101057093 | 10/2007 | ............. F16J 15/34 |

(Continued)

OTHER PUBLICATIONS

Chinese Office Action issued in application No. 201480066158.7, dated Jan. 4, 2017 (9 pgs).

(Continued)

*Primary Examiner* — Nathan Cumar
(74) *Attorney, Agent, or Firm* — Hayes Soloway, P.C.

(57) ABSTRACT

Sealing faces of a pair of sliding parts include circulation grooves, each including an inlet section, an outlet section, and a communication section provided in one of the sealing faces. A positive pressure generation mechanism is provided in a part surrounded by the fluid circulation groove and a high pressure fluid side, and a negative pressure generation mechanism is provided on a low pressure fluid side between the plurality of fluid circulation grooves.

13 Claims, 6 Drawing Sheets

(56) References Cited

U.S. PATENT DOCUMENTS

| | | | |
|---|---|---|---|
| 9,228,660 B2 | 1/2016 | Hosoe et al. | F16J 15/3412 |
| 9,279,455 B2 | 3/2016 | Tokunaga | F16C 33/74 |
| 2013/0209011 A1* | 8/2013 | Tokunaga | F16C 17/045 |
| | | | 384/123 |
| 2014/0008873 A1 | 1/2014 | Inoue | F16J 15/441 |
| 2014/0294330 A1 | 10/2014 | Tokunaga | 384/123 |
| 2014/0294331 A1 | 10/2014 | Tokunaga | 384/123 |
| 2014/0314352 A1* | 10/2014 | Tokunaga | F16C 17/045 |
| | | | 384/123 |

FOREIGN PATENT DOCUMENTS

| | | | |
|---|---|---|---|
| CN | 102713376 | 10/2012 | F16J 15/34 |
| CN | 103097782 | 5/2013 | F16C 17/04 |
| CN | 103429939 | 12/2013 | F04D 29/047 |
| JP | S57146955 | 9/1982 | F16J 15/34 |
| JP | S64049771 | 2/1989 | F16J 15/34 |
| JP | H01133572 | 9/1989 | F16J 15/34 |
| JP | 02236067 | 9/1990 | F16J 15/34 |
| JP | H0417570 | 2/1992 | F16J 15/34 |
| JP | H04101077 | 9/1992 | F16J 15/34 |
| JP | H07035242 | 2/1995 | F16J 15/34 |
| JP | H07180772 | 7/1995 | F16J 15/34 |
| JP | H07224948 | 8/1995 | F16J 15/34 |
| JP | H09329247 | 12/1997 | F16J 15/34 |
| WO | WO2012046749 | 4/2012 | F16C 17/04 |
| WO | WO2014103630 | 7/2014 | F16J 15/34 |

OTHER PUBLICATIONS

International Preliminary Report on Patentability issued in application No. PCT/JP2014/082247, dated Jun. 23, 2016 (7 pgs).

International Preliminary Report on Patentability issued in application No. PCT/JP2014/082246, dated Jun. 23, 2016 (6 pgs).

International Search Report and Written Opinion issued in application No. PCT/JP2014/082247, dated Jan. 13, 2015 (13 pgs).

International Search Report and Written Opinion issued in application No. PCT/JP2014/082246, dated Jan. 13, 2015 (8 pgs).

International Search Report issued in application No. PCT/JP2013/082535, dated Mar. 3, 2014 (5 pgs).

* cited by examiner

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In a mechanical seal serving as one example of the sliding parts, performances thereof are evaluated by a leakage amount, a wear amount, and torque. In the prior art, the performances are enhanced by optimizing sliding material and sealing face roughness of the mechanical seal, so as to realize low leakage, long life, and low torque. However, due to raising awareness of environmental problems in recent years, further improvement in the performances of the mechanical seal is required, and there is a need for technical development going beyond the boundary of the prior art.

Under such circumstances, for example, in a mechanical seal of a water pump used for cooling a water cooling type engine, the present inventor confirmed that over time, LLC additive agents serving as a kind of an antifreeze such as silicate and phosphate (hereinafter, referred to as the "sediment causative substances") are concentrated on sealing faces, sediment is generated, and there is a fear that functions of the mechanical seal are lowered. This generation of the sediment is thought to be a phenomenon that is similarly generated in a mechanical seal of a device in which chemicals and oil are used.

In the conventional mechanical seal, a mechanical seal in which a fluid introduction groove for forming a fluid layer on a sealing face is formed in order to prevent generation of wear and burnout due to friction heat generation of the sealing face is known (for example, refer to Patent Citations 1, 2, 3). However, a mechanical seal to offer a measure for preventing generation of sediment on a sealing face in addition to reduction of leakage and wear is not proposed in a current situation.

CITATION LIST

Patent Literature

Patent Citation 1: JP7-180772 A
Patent Citation 2: JP7-224948 A
Patent Citation 3: U.S. Pat. No. 5,498,007 A

SUMMARY OF INVENTION

Technical Problem

An objective of the present invention is to provide sliding parts by which a sealing function of sealing faces can be maintained for a long time by actively taking a fluid into the sealing faces and discharging the fluid from the sealing faces while meeting contradictory conditions of sealing and lubrication so as to prevent concentration of sediment causative substances on the sealing faces and hence prevent generation of sediment.

Solution to Problem

In order to achieve the foregoing objective, a first aspect of the sliding parts of the present invention is a pair of sliding parts including sealing faces that relatively slide on each other, characterized in that fluid circulation grooves, each of the fluid circulation grooves including an inlet section where a fluid comes in from a high pressure fluid side, an outlet section where the fluid goes out to the high pressure fluid side, and a communication section that provides communication between the inlet section and the outlet section are provided in at least one of the sealing faces, the plurality of fluid circulation grooves is isolated from a low pressure fluid side by a land section, and provided in the circumferential direction of the sealing face and isolated by the land section, a positive pressure generation mechanism is provided in a part surrounded by the fluid circulation groove and the high pressure fluid side, a negative pressure generation mechanism is provided on the low pressure fluid side between the plurality of fluid circulation grooves, an auxiliary fluid circulation groove including an inlet section where the fluid comes in from the high pressure fluid side, an outlet section where the fluid goes out to the high pressure fluid side, and a communication section that provides communication between the inlet section and the outlet section is further provided on the high pressure fluid side between the plurality of fluid circulation grooves, and an auxiliary positive pressure generation mechanism is provided in a part surrounded by the auxiliary fluid circulation groove and the high pressure fluid side.

According to this aspect, by actively guiding the fluid to the sealing faces and discharging the fluid by the fluid circulation grooves, the fluid between the sealing faces is circulated, concentration of the fluid containing sediment causative substances and the like and retention of wear powder and foreign substances are prevented, and hence formation of sediment is prevented, so that a sealing function of the sealing faces can be maintained for a long time. At the time, the fluid circulation grooves are isolated from the low pressure fluid side by the land section. Thus, leakage of the fluid from the fluid circulation grooves to the low pressure fluid side can be reduced and leakage in a static state can also be prevented. At the same time, by increasing a fluid film between the sealing faces by the positive pressure generation mechanism, a lubrication performance is improved, so that circulation of the fluid between the sealing faces can be furthermore facilitated.

Further, by the negative pressure generation mechanism arranged on the low pressure fluid side in the radial direction of the sealing face, a sealed fluid to be leaked out from the high pressure fluid side to the low pressure fluid side is taken in and returned to the high pressure fluid side via the fluid circulation grooves, so that a sealing property can be improved.

Further, by actively guiding the fluid to the sealing faces between the plurality of fluid circulation grooves isolated from each other in the circumferential direction and discharging the fluid by the auxiliary fluid circulation groove arranged on the high pressure fluid side in the radial direction of the sealing face, the fluid between the sealing faces is circulated, the concentration of the fluid containing the sediment causative substances and the like and the retention of the wear powder and the foreign substances can be furthermore prevented. At the same time, a region other than a positive pressure generation region of the positive pressure generation mechanism can be covered by the auxiliary positive pressure generation mechanism, so that the circulation of the fluid between the sealing faces can be promoted thoroughly.

A second aspect of the sliding parts of the present invention relates to the first aspect, characterized in that the positive pressure generation mechanism is formed from a Rayleigh step mechanism, and a positive pressure generation groove that forms the Rayleigh step mechanism communicates with the inlet section of the fluid circulation groove, and is isolated from the communication section and the outlet section and the high pressure fluid side by a land section.

According to this aspect, the positive pressure generation mechanism that is suitable for the sealing face can be easily formed. Since the positive pressure generation mechanism is formed in such a manner that the inlet section of the fluid circulation groove is utilized, manufacture thereof can be simplified.

A third aspect of the sliding parts of the present invention relates to the first or second aspect, characterized in that the negative pressure generation mechanism is formed from a reversed Rayleigh step mechanism, and a negative pressure generation groove that forms the reversed Rayleigh step mechanism communicates with the inlet section of the fluid circulation groove, and is isolated from the communication section and the outlet section and the low pressure fluid side by a land section.

According to this aspect, the negative pressure generation mechanism that is suitable for the sealing face can be easily formed. Since the negative pressure generation mechanism is formed in such a manner that the inlet section or the communication section of the fluid circulation groove is utilized, manufacture thereof can be simplified.

A fourth aspect of the sliding parts of the present invention relates to any of the first to third aspects, characterized in that the auxiliary positive pressure generation mechanism is formed from a Rayleigh step mechanism, and an auxiliary positive pressure generation groove that forms the Rayleigh step mechanism communicates with the inlet section of the auxiliary fluid circulation groove, and is isolated from the communication section and the outlet section of the auxiliary fluid circulation groove and the high pressure fluid side by a land section.

According to this aspect, the auxiliary positive pressure generation mechanism that is suitable for an extremely limited position can be easily formed. Since the auxiliary positive pressure generation mechanism is formed in such a manner that the inlet section of the auxiliary fluid circulation groove is utilized, manufacture thereof can be simplified.

A fifth aspect of the sliding parts of the present invention relates to any of the first to third aspects, characterized in that the auxiliary positive pressure generation mechanism is formed from a block groove mechanism, an auxiliary block groove that forms the block groove mechanism includes a plurality of rectangular grooves arranged in the circumferential direction, the rectangular groove on the upstream side communicates with the inlet section of the auxiliary fluid circulation groove and the high pressure fluid side, and is isolated from the communication section and the outlet section of the auxiliary fluid circulation groove by a land section, and the other rectangular grooves communicate only with the high pressure fluid side.

According to this aspect, an influence of an undulation of the sealing face on a dynamic characteristic can be reduced. Even if the auxiliary fluid circulation groove is filled by any chance, dynamic pressure is generated by the fluid flowing in from the high pressure fluid side. Thus, a robust property can be enhanced.

A sixth aspect of the sliding parts of the present invention relates to any of the first to third aspects, characterized in that the auxiliary positive pressure generation mechanism is formed from a comb shaped groove mechanism, and an auxiliary comb shaped groove that forms the comb shaped groove mechanism is formed over the entire face of a part surrounded by the auxiliary fluid circulation groove and the high pressure fluid side excluding a plurality of rectangular land sections arranged in the circumferential direction while facing the high pressure fluid side.

According to this aspect, the influence of the undulation of the sealing face on the dynamic characteristic can be reduced. Even if the auxiliary fluid circulation groove is filled by any chance, the dynamic pressure is generated by the fluid flowing in from the high pressure fluid side. Thus, the robust property can be enhanced. A deposit due to generation of cavitation can be prevented from being accumulated in the auxiliary comb shaped groove.

Advantageous Effects of Invention

The present invention exhibits the following superior effects.

(1) By actively guiding the fluid to the sealing faces and discharging the fluid by the fluid circulation grooves, the fluid between the sealing faces is circulated, the concentration of the fluid containing the sediment causative substances and the like and the retention of the wear powder and the foreign substances are prevented, and hence the formation of the sediment is prevented, so that the sealing function of the sealing faces can be maintained for a long time. At the time, the fluid circulation grooves are isolated from the low pressure fluid side by the land section. Thus, the leakage of the fluid from the fluid circulation grooves to the low pressure fluid side can be reduced and the leakage in a static state can also be prevented. At the same time, by increasing the fluid film between the sealing faces by the positive pressure generation mechanism, the lubrication performance is improved, so that the circulation of the fluid between the sealing faces can be furthermore facilitated.

Further, by the negative pressure generation mechanism arranged on the low pressure fluid side in the radial direction of the sealing face, the sealed fluid to be leaked out from the high pressure fluid side to the low pressure fluid side is taken in and returned to the high pressure fluid side via the fluid circulation grooves, so that the sealing property can be improved.

Further, by actively guiding the fluid to the sealing faces between the plurality of fluid circulation grooves isolated from each other in the circumferential direction and discharging the fluid by the auxiliary fluid circulation groove arranged on the high pressure fluid side in the radial direction of the sealing face, the fluid between the sealing faces is circulated, the concentration of the fluid containing the sediment causative substances and the like and the retention of the wear powder and the foreign substances can be furthermore prevented. At the same time, the region other than the positive pressure generation region of the positive pressure generation mechanism can be covered by the auxiliary positive pressure generation mechanism, so that the circulation of the fluid between the sealing faces can be promoted thoroughly.

(2) The positive pressure generation mechanism is formed from the Rayleigh step mechanism, and the positive pressure generation groove that forms the Rayleigh step mechanism communicates with the inlet section of the fluid circulation groove, and is isolated from the communication section and the outlet section and the high pressure fluid side by the land section. Thus, the positive pressure generation mechanism that is suitable for the sealing face can be easily formed. Since the positive pressure generation mechanism is formed in such a manner that the inlet section of the fluid circulation groove is utilized, the manufacture thereof can be simplified.

(3) The negative pressure generation mechanism is formed from the reversed Rayleigh step mechanism, and the negative pressure generation groove that forms the reversed Rayleigh step mechanism communicates with the inlet section of the fluid circulation groove, and is isolated from the communication section and the outlet section and the low pressure fluid side by the land section. Thus, the negative pressure generation mechanism that is suitable for the sealing face can be easily formed. Since the negative pressure generation mechanism is formed in such a manner that the inlet section or the communication section of the fluid circulation groove is utilized, the manufacture thereof can be simplified.

(4) The auxiliary positive pressure generation mechanism is formed from the Rayleigh step mechanism, and the auxiliary positive pressure generation groove that forms the Rayleigh step mechanism communicates with the inlet section of the auxiliary fluid circulation groove, and is isolated from the communication section and the outlet section of the auxiliary fluid circulation groove and the high pressure fluid side by the land section. Thus, the auxiliary positive pressure generation mechanism that is suitable for the extremely limited position can be easily formed. Since the auxiliary positive pressure generation mechanism is formed in such a manner that the inlet section of the auxiliary circulation groove is utilized, the manufacture thereof can be simplified.

(5) The auxiliary positive pressure generation mechanism is formed from the block groove mechanism, the auxiliary block groove that forms the block groove mechanism includes the plurality of rectangular grooves arranged in the circumferential direction, the rectangular groove on the upstream side communicates with the inlet section of the auxiliary fluid circulation groove and the high pressure fluid side, and is isolated from the communication section and the outlet section of the auxiliary fluid circulation groove by the land section, and the other rectangular grooves communicate only with the high pressure fluid side. Thus, the influence of the undulation of the sealing face on the dynamic characteristic can be reduced. Even if the auxiliary fluid circulation groove is filled by any chance, the dynamic pressure is generated by the fluid flowing in from the high pressure fluid side. Thus, the robust property can be enhanced.

(6) The auxiliary positive pressure generation mechanism is formed from the comb shaped groove mechanism, and the auxiliary comb shaped groove that forms the comb shaped groove mechanism is formed over the entire face of the part surrounded by the auxiliary fluid circulation groove and the high pressure fluid side excluding the plurality of rectangular land sections arranged in the circumferential direction while facing the high pressure fluid side. Thus, the influence of the undulation of the sealing face on the dynamic characteristic can be reduced. Even if the auxiliary fluid circulation groove is filled by any chance, the dynamic pressure is generated by the fluid flowing in from the high pressure fluid side. Thus, the robust property can be enhanced. The deposit due to the generation of the cavitation can be prevented from being accumulated in the auxiliary comb shaped groove.

BRIEF DESCRIPTION OF DRAWINGS

FIG. 6 is a view for illustrating a positive pressure generation mechanism formed from a Rayleigh step mechanism or the like, and a negative pressure generation mechanism formed from a reversed Rayleigh step mechanism or the like: FIG. 6(a) shows the Rayleigh step mechanism; and FIG. 6(b) shows the reversed Rayleigh step mechanism.

DESCRIPTION OF EMBODIMENTS

Hereinafter, with reference to the drawings, modes for carrying out the present invention will be described with examples based on embodiments. However, regarding size, material, shape, and relative arrangement of constituent parts described in the embodiments, and the like, there is no intention to limit the scope of the present invention only to those unless specifically and clearly described.

First Embodiment

Figure 1:
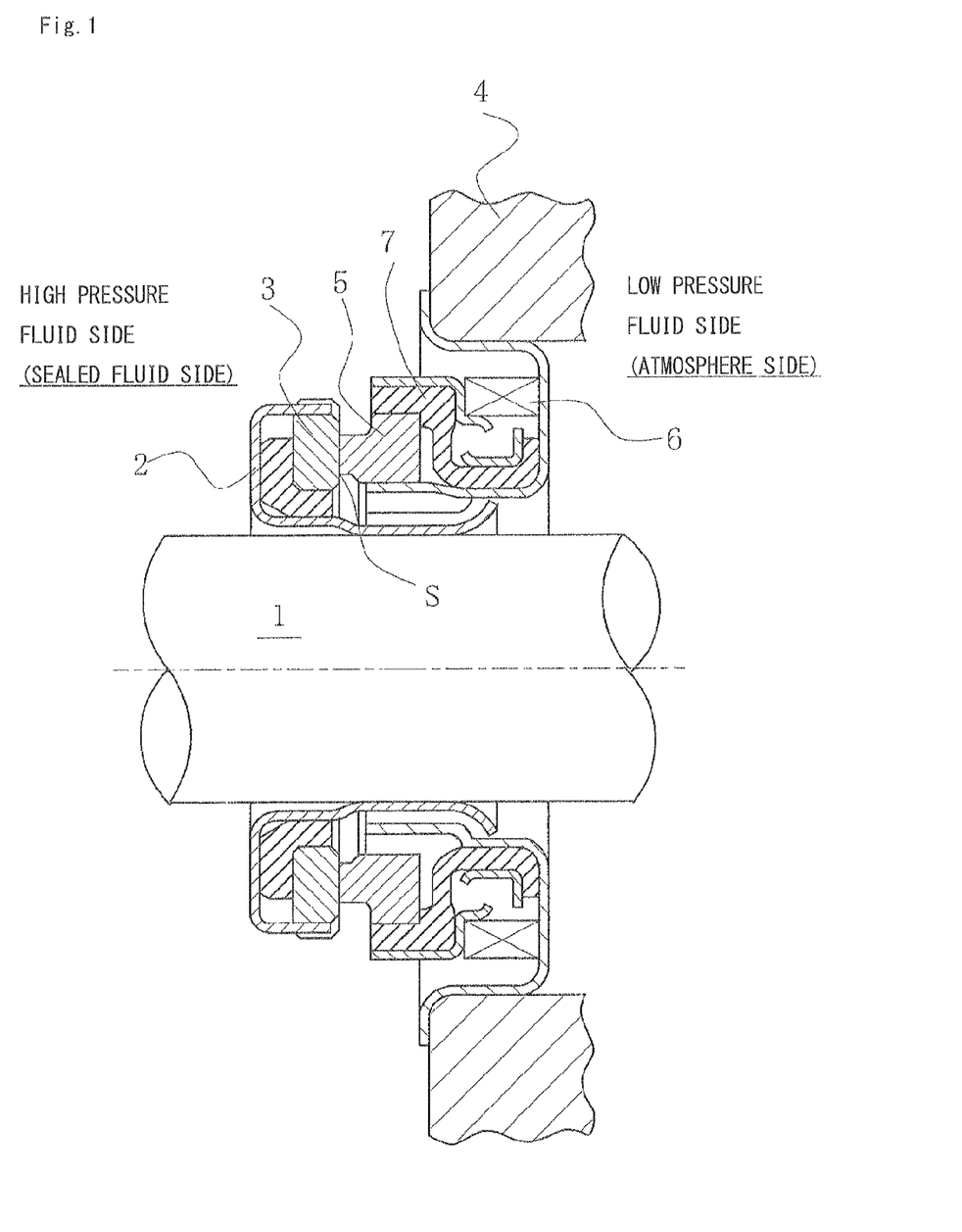
FIG. 1 is a vertically sectional view showing one example of a mechanical seal according to a first embodiment of the present invention.
Figure 2:
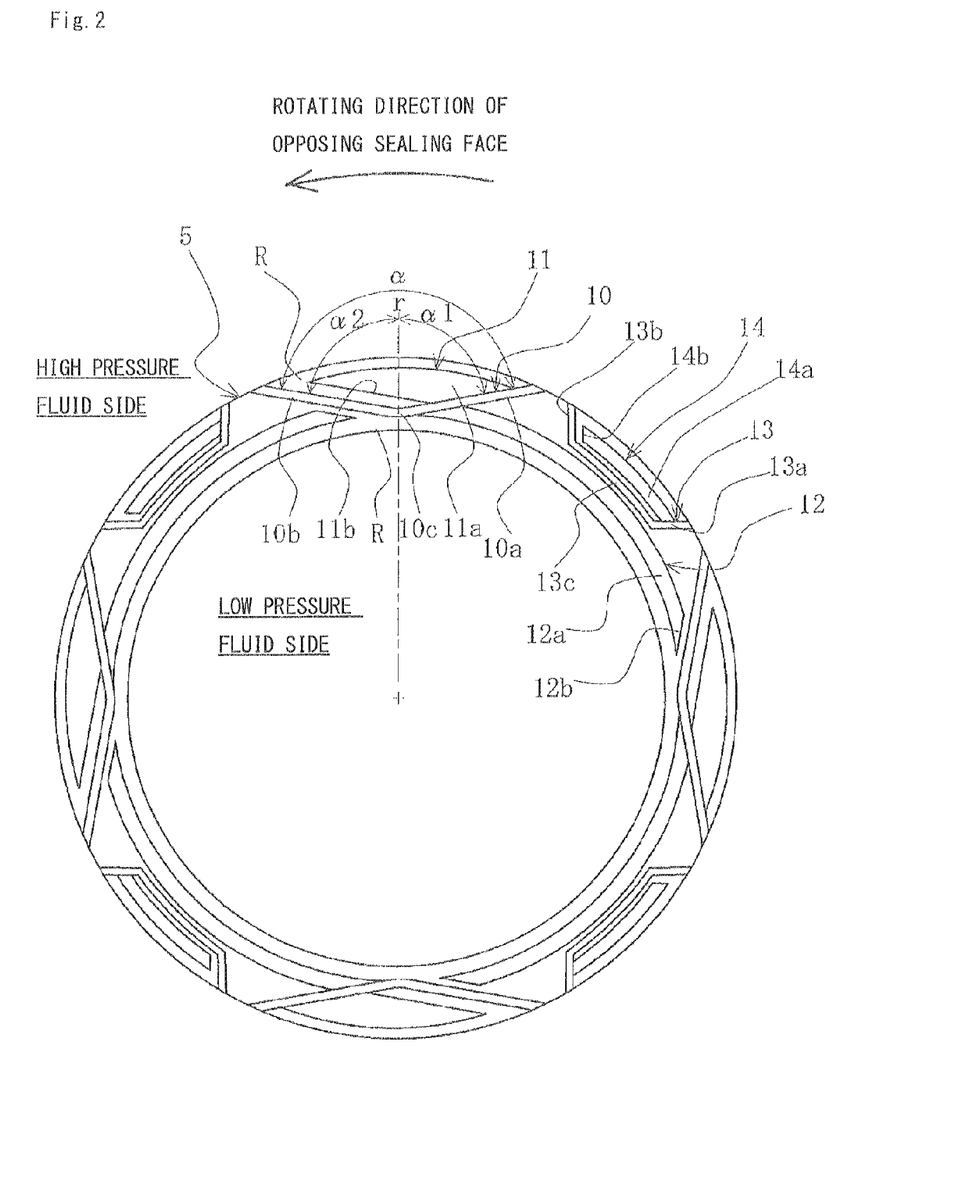
FIG. 2 shows a sealing face of a sliding part according to the first embodiment of the present invention.
Figure 3:
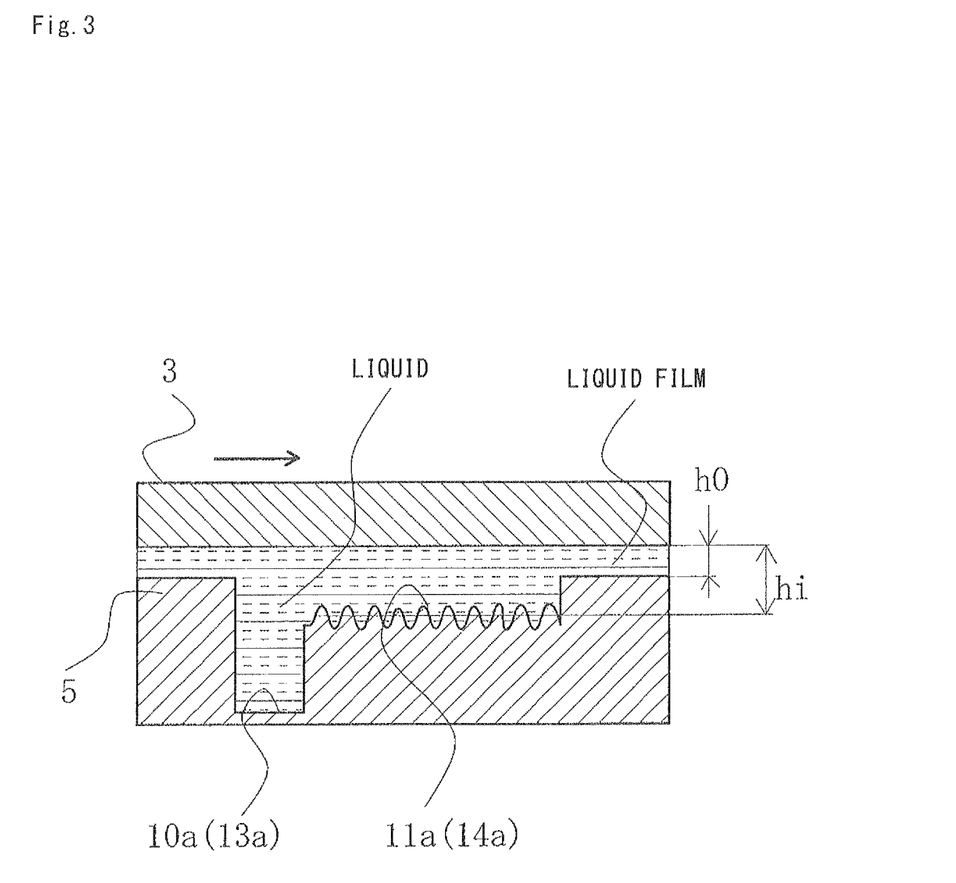
FIG. 3 is a view for illustrating a relationship between the depth of a positive pressure generation mechanism of a Rayleigh step mechanism and generated dynamic pressure.

With reference to FIGS. 1 to 3, sliding parts according to a first embodiment of the present invention will be described.

It should be noted that in the following embodiment, a mechanical seal serving as one example of the sliding parts will be described as an example. In the description, an outer peripheral side of the sliding parts that form the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around.

FIG. 1 is a vertically sectional view showing one example of the mechanical seal that is an inside mechanical seal for sealing a sealed fluid on the high pressure fluid side to be leaked out from an outer periphery of a sealing face toward an inner periphery. In the mechanical seal, on the side of a rotating shaft 1 that drives a pump impeller (not shown) on the high pressure fluid side, an annular rotating ring 3 serving as one of the sliding parts is provided via a sleeve 2 in a state that the rotating ring can be rotated integrally with this rotating shaft 1, an annular stationary ring 5 serving as the other sliding part is provided in a housing 4 of a pump in a state that the stationary ring is not rotated but can be moved in the axial direction, and sealing faces S mirror-finished by lapping or the like closely slide on each other by means of a coiled wave spring 6 and bellows 7 that bias the stationary ring 5 in the axial direction. That is, this mechanical seal is to prevent the sealed fluid from flowing out from an outer periphery of the rotating shaft 1 to the atmosphere side on the sealing faces S of the rotating ring 3 and the stationary ring 5.

It should be noted that although FIG. 1 shows a case where the sealing face width of the rotating ring 3 is greater than the sealing face width of the stationary ring 5, the present invention is not limited to this but can be applied to an opposite case as a matter of course.

FIG. 2 shows the sealing face of the sliding part according to the first embodiment of the present invention. A case where fluid circulation grooves are formed on the sealing face of the stationary ring 5 of FIG. 2 will be described as an example.

It should be noted that a case where the fluid circulation grooves are formed on the sealing face of the rotating ring 3 is basically similar. However, in that case, the fluid circulation grooves are only required to communicate with the sealed fluid side and hence not required to be provided up to the outer peripheral side of the sealing face.

In FIG. 2, the outer peripheral side of the sealing face of the stationary ring 5 serves as the high pressure fluid side, the inner peripheral side serves as the low pressure fluid side such as the atmosphere side, and the opposing sealing face is rotated anti-clockwise.

On the sealing face of the stationary ring 5, a plurality of fluid circulation grooves 10 that communicates with the high pressure fluid side and is isolated from the low pressure fluid side by a smooth section R (sometimes referred to as the "land section" in the present invention) of the sealing face is provided in the circumferential direction.

Each of the fluid circulation grooves 10 includes an inlet section 10a where the fluid comes in from the high pressure fluid side, an outlet section 10b where the fluid goes out to the high pressure fluid side, and a communication section 10c that provides communication between the inlet section 10a and the outlet section 10b in the circumferential direction, and is isolated from the lower pressure fluid side by the land section R. The fluid circulation groove 10 plays a role of actively introducing the sealed fluid onto the sealing face from the high pressure fluid side and discharging the fluid in order to prevent concentration of the fluid containing corrosion products and the like on the sealing face. The inlet section 10a and the outlet section 10b are formed in such a manner that the sealed fluid is easily taken onto the sealing face and discharged in accordance with the rotating direction of the opposing sealing face, while the fluid circulation groove is isolated from the low pressure fluid side by the land section R in order to reduce leakage.

It should be noted that in the present specification, the "inlet section where the fluid comes in from the high pressure fluid side" indicates a part heading off in the inner diameter direction of the fluid circulation groove, and the "outlet section where the fluid goes out to the high pressure fluid side" indicates a part heading off in the outer diameter direction of the fluid circulation groove in the description.

The plurality of fluid circulation grooves 10 is arranged in the circumferential direction of the sealing face at equal intervals and isolated by the land section R. In this example, the four fluid circulation grooves are arranged at equal intervals.

The fluid circulation groove 10 is formed in a shape substantially left-right symmetric with respect to a radius line r of the sealing face in a plan view of the sealing face, and an intersection angle α on the high pressure fluid side made by left and right parts of the fluid circulation groove 10, that is, the inlet section 10a and the outlet section 10b is set within a range from 120° to 180°.

It should be noted that the shape of the fluid circulation groove 10 in a plan view is not necessarily a shape left-right symmetric with respect to the radius line r but an intersection angle α1 of the inlet section 10a may be larger than an intersection angle α2 of the outlet section 10b and vice versa.

In the present specification, the phrase "substantially left-right symmetric" indicates a range of α1=α2±5°.

A preferable range of the intersection angle α is a range from 120° to 180°. However, the present invention is not necessarily limited to a range from 120° to 180°.

Further, the shape of the fluid circulation groove 10 in a plan view may be formed in a curved shape (such as an arc shape) as a whole without having a linear part.

The width and the depth of the fluid circulation groove 10 may be set to be optimal in accordance with pressure, a type (viscosity), and the like of the sealed fluid.

On the sealing face in which the fluid circulation grooves 10 are provided, a positive pressure generation mechanism 11 including a positive pressure generation groove 11a that is shallower than the fluid circulation groove 10 is provided in a part surrounded by each of the fluid circulation grooves 10 and the high pressure fluid side. The positive pressure generation mechanism 11 increases a fluid film between the sealing faces by generating positive pressure (dynamic pressure), so as to improve a lubrication performance.

In this example, the positive pressure generation mechanism 11 is formed from a Rayleigh step mechanism including the positive pressure generation groove 11a that communicates with the inlet section 10a of the fluid circulation groove 10 and is isolated from the outlet section 10b and the high pressure fluid side by a land section R, and a Rayleigh step 11b. However, the present invention is not limited to this. For example, the positive pressure generation mechanism may be formed from a femto groove with a dam, that is, any mechanism that generates positive pressure.

Since the positive pressure generation mechanism 11 is formed in such a manner that the inlet section 10a of the fluid circulation groove 10 is utilized, manufacture thereof can be simplified.

A reversed Rayleigh step mechanism 12 that forms a negative pressure generation mechanism including a groove 12a and a reversed Rayleigh step 12b which form a negative pressure generation groove shallower than the fluid circulation groove 10 is further provided on the outside of a part of the sealing face surrounded by each of the fluid circulation grooves 10 and the high pressure fluid side, that is, between the adjacent fluid circulation grooves 10, 10.

In the reversed Rayleigh step mechanism 12, the radial width of the groove 12a is set to be narrow, and the groove is arranged close to the low pressure fluid side in the radial direction of the sealing face.

The groove 12a communicates with the inlet section 10a or the communication section 10c of the fluid circulation groove 10, and is isolated from the outlet section 10b and the low pressure fluid side by the land section R.

Since the reversed Rayleigh step mechanism 12 is formed in such a manner that the inlet section 10a or the communication section 10c of the fluid circulation groove 10 is utilized, manufacture thereof can be simplified.

It should be noted that the Rayleigh step mechanism and the reversed Rayleigh step mechanism will be described in detail later.

Further, an auxiliary fluid circulation groove 13 including an inlet section 13a where the fluid comes in from the high pressure fluid side, an outlet section 13h where the fluid goes out to the high pressure fluid side, and a communication section. 13c that provides communication between the inlet section 13a and the outlet section 13h is provided on the high pressure fluid side between the plurality of fluid circulation grooves 10, 10 of the sealing face. The radial width of a part of the sealing face where the auxiliary fluid circulation groove 13 is provided is about a half of the radial width of the sealing face. Thus, in comparison to the case of the fluid circulation groove 10, the inclination of the inlet section 10a and the outlet section. 10b is steep, and the length of the inlet section 10a and the outlet section 10b is short. Further, the width and the depth of the auxiliary fluid circulation groove 13 may be about the same as or slightly smaller than the fluid circulation groove 10.

It should be noted that the shape of the fluid circulation groove can be formed in various modes such as a substantially V shape as in the fluid circulation groove 10 or a substantially U shape as in the auxiliary fluid circulation groove 13. However, in the present specification, in principle, the "inlet section where the fluid comes in from the high pressure fluid side" indicates the part heading off in the inner diameter direction of the fluid circulation groove, and the "outlet section where the fluid goes out to the high pressure fluid side" indicates the part heading off in the outer diameter direction of the fluid circulation groove in the description. Therefore, the "communication section that provides communication between the inlet section and the outlet section" may be extremely short or may have appropriate length.

Further, an auxiliary positive pressure generation mechanism 14 including an auxiliary positive pressure generation groove 14a is provided in a part of the sealing face surrounded by the auxiliary fluid circulation groove 13 and the high pressure fluid side.

The auxiliary positive pressure generation mechanism 14 is formed from a Rayleigh step mechanism including the positive pressure generation groove 14a and a Rayleigh step 14b, and the auxiliary positive pressure generation groove 14a that forms the Rayleigh step mechanism communicates with the inlet section 13a of the auxiliary fluid circulation groove 13, and is isolated from the outlet section 13b and the high pressure fluid side by a land section R.

This auxiliary positive pressure generation mechanism 14 has the groove depth and the groove width with which dynamic pressure is easily generated on the lower speed side with respect to the main Rayleigh step mechanism 11 described above, so as to cover a region other than a positive pressure generation region of the main Rayleigh step mechanism 11 or the like.

With reference to FIG. 3, a relationship between the depth of the positive pressure generation groove 11a (14a) of the Rayleigh step mechanism 11 (14) and the generated dynamic pressure will be simply described.

In FIG. 3, the thickness of a liquid film on the sealing faces S of the rotating ring 3 and the stationary ring 5 is h0, and the sum of the depth of the positive pressure generation groove 11a (14a) and the thickness of the liquid film is hi. When the value m represented as follows is 2 to 4, a pressure coefficient Kp becomes the greatest.

$m=hi/h0$

The higher the pressure coefficient Kp is, the greater the dynamic pressure generated by the Rayleigh step mechanism 11 (14) becomes.

As described above, according to the configuration of the first embodiment, by actively guiding the fluid to the sealing faces and discharging the fluid by the fluid circulation grooves 10, the fluid between the sealing faces is circulated, concentration of the fluid containing sediment causative substances and the like and retention of wear powder and foreign substances are prevented, and hence formation of sediment is prevented, so that a sealing function of the sealing faces can be maintained for a long time. At the time, the fluid circulation grooves 10 are isolated from the low pressure fluid side by the land section R. Thus, leakage of the fluid from the fluid circulation grooves 10 to the low pressure fluid side can be reduced and leakage in a static state can also be prevented. At the same time, by increasing the fluid film between the sealing faces by the positive pressure generation mechanism 11, a lubrication performance is improved, so that circulation of the fluid between the sealing faces can be furthermore facilitated.

Further, by the reversed Rayleigh step mechanism 12 that forms the negative pressure generation mechanism arranged on the low pressure fluid side in the radial direction of the sealing face, the sealed fluid to be leaked out from the high pressure fluid side to the low pressure fluid side is taken into the groove 12a and returned to the high pressure fluid side via the fluid circulation grooves 10, so that a sealing property can be improved.

Further, by actively guiding the fluid to the sealing faces between the plurality of fluid circulation grooves 10, 10 isolated from each other in the circumferential direction and discharging the fluid by the auxiliary fluid circulation groove 13 arranged on the high pressure fluid side in the radial direction of the sealing face, the fluid between the sealing faces is circulated, the concentration of the fluid containing the sediment causative substances and the like and the retention of the wear powder and the foreign substances can be furthermore prevented. At the same time, the region other than the positive pressure generation region of the main Rayleigh step mechanism 11 can be covered by the auxiliary positive pressure generation mechanism 14, so that the circulation of the fluid between the sealing faces can be promoted thoroughly.

Second Embodiment

Figure 4:
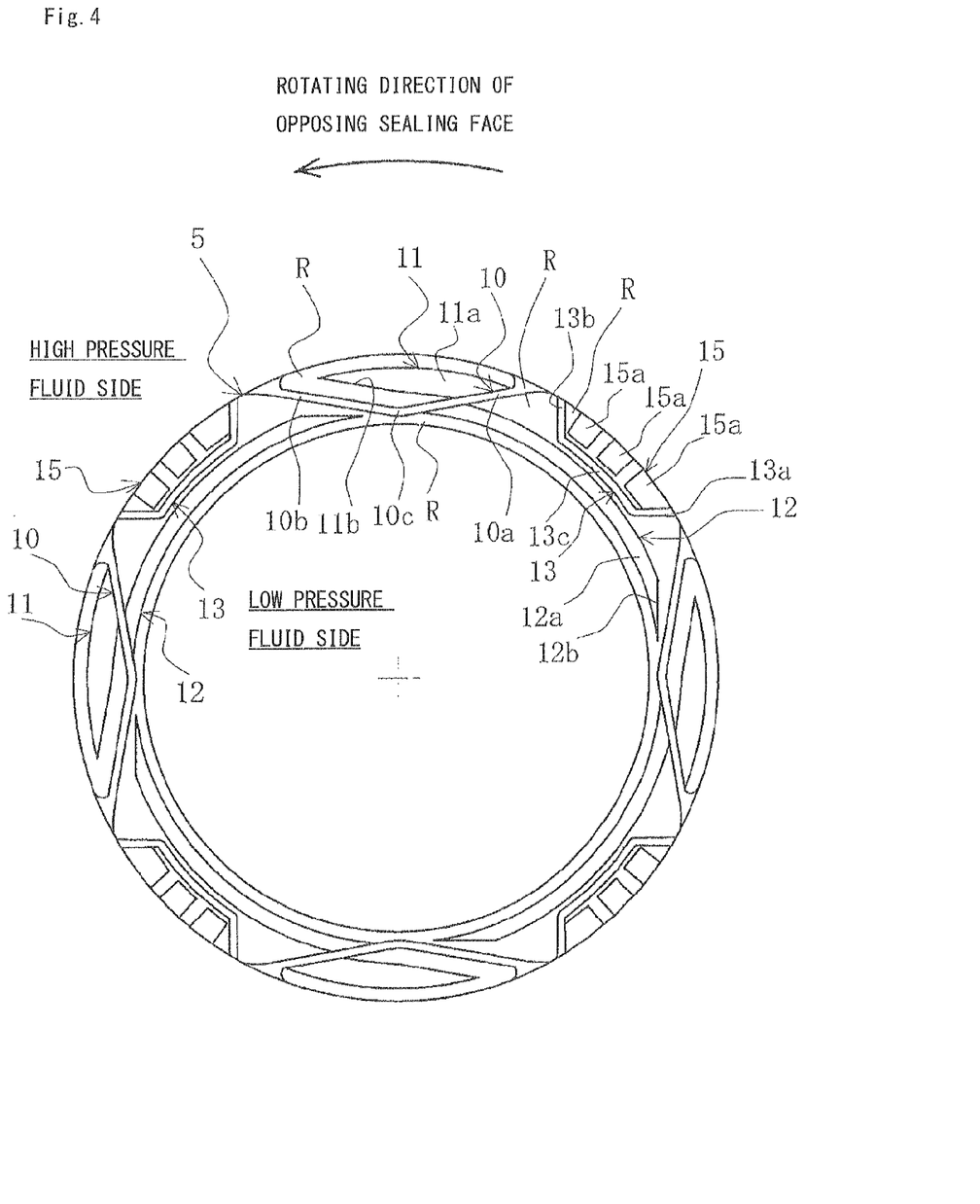
FIG. 4 shows a sealing face of a sliding part according to a second embodiment of the present invention.

With reference to FIG. 4, sliding parts according to a second embodiment of the present invention will be described.

The sliding parts according to the second embodiment are different from the sliding parts of the first embodiment in terms of the configuration of the auxiliary positive pressure generation mechanism. However, the other basic configurations are the same as the first embodiment. The same members will be given the same reference signs and duplicated description will be omitted.

An auxiliary positive pressure generation mechanism 15 shown in FIG. 4 is formed from a block groove mechanism, an auxiliary positive pressure generation groove 15a that forms the block groove mechanism includes a plurality of rectangular grooves arranged in the circumferential direction, the rectangular groove on the upstream side communicates with the inlet section 13a of the auxiliary fluid circulation groove 13 and the high pressure fluid side, and is isolated from the communication section 13c and the outlet section 13b of the auxiliary fluid circulation groove 13 by a land section R, and the other rectangular grooves communicate only with the high pressure fluid side.

This auxiliary positive pressure generation mechanism 15 has the groove depth and the groove shape with which the dynamic pressure is easily generated on the lower speed side with respect to the main Rayleigh step mechanism 11 described above, so as to cover the region other than the positive pressure generation region of the main Rayleigh step mechanism 11 or the like.

Normally, the sealing face has an undulation of about 0.2 μm even after finishing. Thus, a part between the sealing faces, that is, the thickness h0 of the liquid film shown in FIG. 3 has variation of 0.2 μm over the circumference.

In a case where the depth of the positive pressure generation groove 14a of the Rayleigh step mechanism 14 shown in FIG. 2 is as extremely shallow as 0.1 μm for example, the value m (=hi/h0) is changed depending on a position on the circumference where the Rayleigh step 14b of the Rayleigh step mechanism 14 is provided. Thus, the generated dynamic pressure is changed depending on the position of the Rayleigh step 14b.

However, when in place of the Rayleigh step mechanism 14 shown in FIG. 2, the plurality of rectangular grooves is arranged in the circumferential direction and the plurality of land sections is provided, so that positive pressure generation portions are dispersed in the circumferential direction as in this example, an influence of the undulation of the sealing face on a dynamic characteristic can be reduced. Even if the auxiliary fluid circulation groove 13 is filled by any chance, the dynamic pressure is generated by the fluid flowing in from the high pressure fluid side. Thus, a robust property can be enhanced.

It should be noted that in this example, the groove width of the inlet section 10a and the outlet section 10b of the fluid circulation groove 10 are gradually extended toward an inlet end and an outlet end, respectively. Therefore, no stagnation of the sealed fluid is formed in the vicinity of the inlet end and the outlet end but a uniform flow is formed, so that an efficient flow is formed. A flow of the sealed fluid discharged from the outlet section 10b of the fluid circulation groove 10 on the upstream side goes round a position away from outer peripheral walls of the sealing faces and does not flow into the fluid circulation groove on the downstream side again. Thus, the concentration of the sealed fluid is prevented, so that an interior of the fluid circulation groove can be always maintained in a clean state.

Third Embodiment

Figure 5:
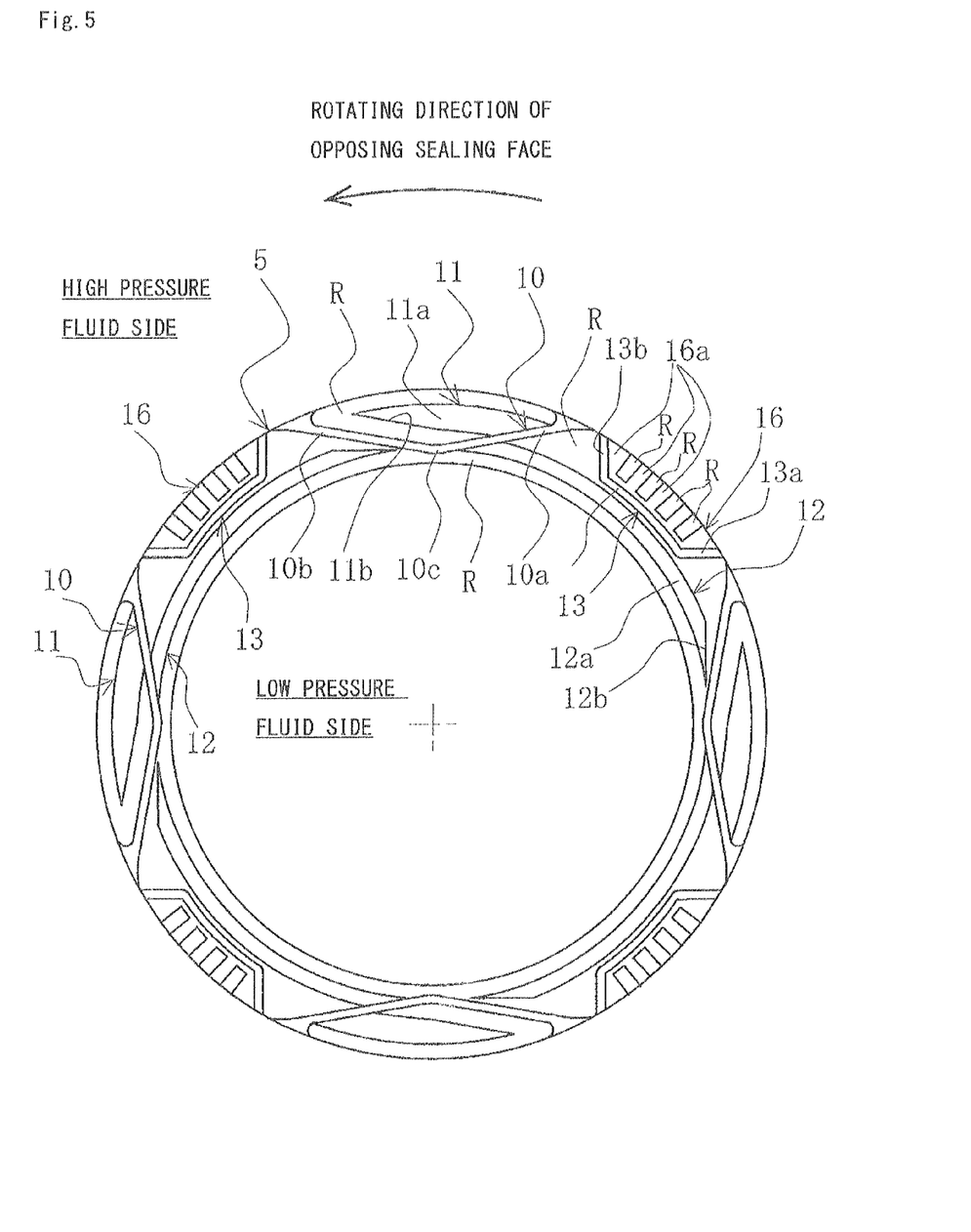
FIG. 5 shows a sealing face of a sliding part according to a third embodiment of the present invention.

With reference to FIG. 5, sliding parts according to a third embodiment of the present invention will be described.

The sliding parts according to the third embodiment are different from the sliding parts of the second embodiment in terms of the configuration of the auxiliary positive pressure generation mechanism. However, the other basic configurations are the same as the second embodiment. The same members will be given the same reference signs and duplicated description will be omitted.

An auxiliary positive pressure generation mechanism 16 shown in FIG. 5 is formed from a comb shaped groove mechanism, and an auxiliary positive pressure generation groove 16a that forms the comb shaped groove mechanism is formed over the entire face of a part surrounded by the auxiliary fluid circulation groove 13 and the high pressure fluid side excluding a plurality of rectangular land sections R1 arranged in the circumferential direction.

This auxiliary positive pressure generation mechanism 16 has the groove depth and the groove shape with which the dynamic pressure is easily generated on the lower speed side with respect to the main Rayleigh step mechanism 11 described above, so as to cover the region other than the positive pressure generation region of the main Rayleigh step mechanism 11 or the like.

When in place of the Rayleigh step mechanism 14 shown in FIG. 2, the comb shaped positive pressure generation groove 16a formed over the entire face excluding the plurality of rectangular land sections R1 which are arranged in the circumferential direction is provided, so that the positive pressure generation portions are dispersed in the circumferential direction as in this example, the influence of the undulation of the sealing face on the dynamic characteristic can be reduced. Even if the auxiliary fluid circulation groove 13 is filled by any chance, the dynamic pressure is generated by the fluid flowing in from the high pressure fluid side. Thus, the robust property can be enhanced.

Further, in the comb shaped positive pressure generation groove 16a, there is no land section on the inner peripheral side unlike the auxiliary positive pressure generation mechanism 15 shown in FIG. 4. Thus, even if cavitation is generated from the land sections to the comb shaped positive pressure generation groove 16a, a deposit due to generation of the cavitation flows from the positive pressure generation groove 16a to the auxiliary fluid circulation groove 13, and is not accumulated in the groove.

Next, with reference to FIG. 6, the positive pressure generation mechanism formed from the Rayleigh step mechanism or the like and the negative pressure generation mechanism formed from the reversed Rayleigh step mechanism or the like will be described with taking the main Rayleigh step mechanism 11 and the reversed Rayleigh step mechanism 12 as an example.

Figure 6:
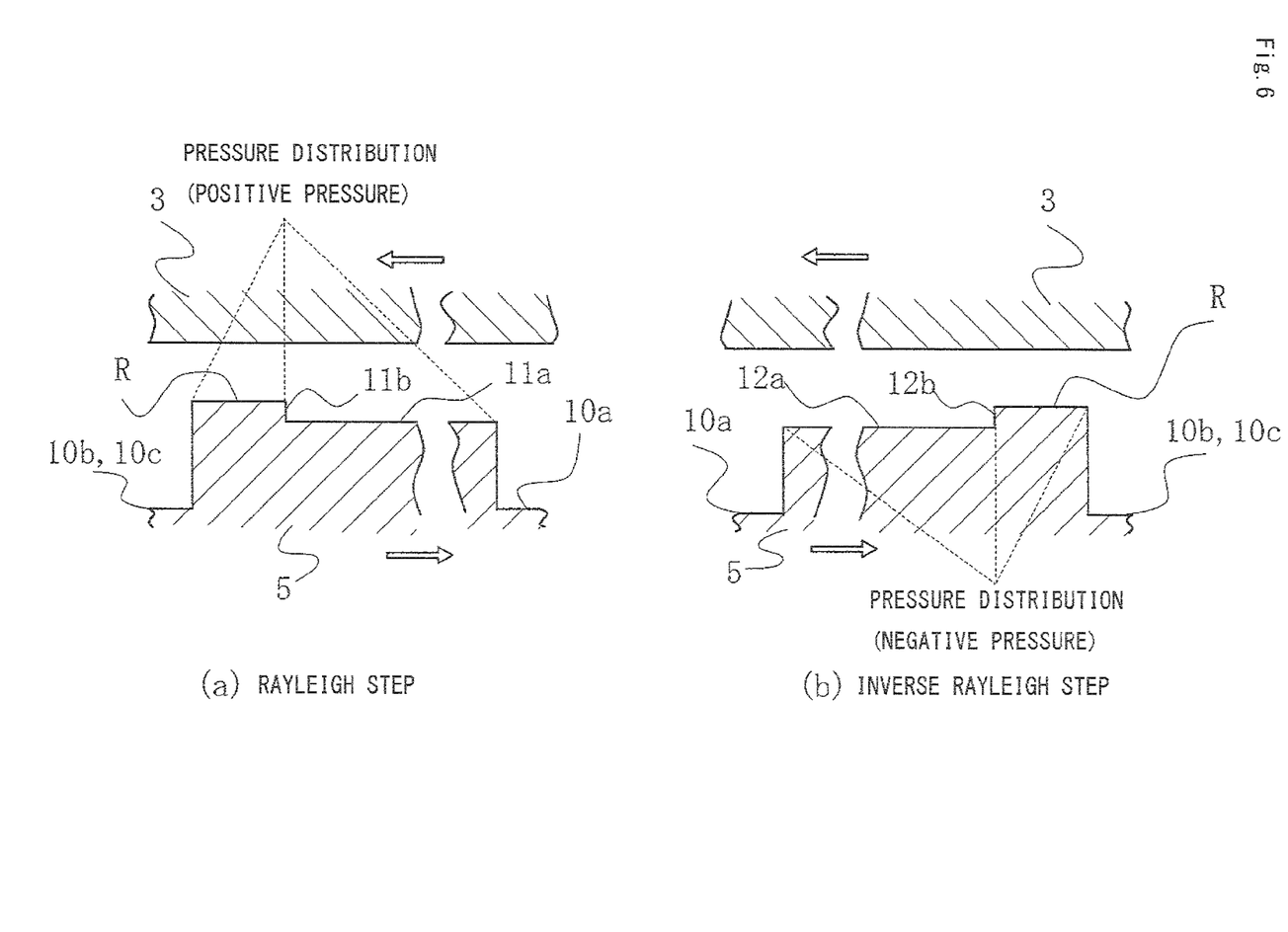

In FIG. 6 (a), the rotating ring 3 and the stationary ring 5 serving as the opposing sliding parts relatively slide on each other as shown by arrows. For example, the Rayleigh step 11b is formed on the sealing face of the stationary ring 5 so as to be perpendicular to the relative movement direction and facing the upstream side, and the groove section 11a serving as the positive pressure generation groove is formed on the upstream side of the Rayleigh step 11b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to a viscous property thereof. Thus, at the time, positive pressure (dynamic pressure) as shown by broken lines is generated due to existence of the Rayleigh step 11b.

It should be noted that the reference signs 10a, 10b, and 10c respectively denote the inlet section, the outlet section, and the communication section of the fluid circulation groove, and the reference sign R denotes the land section.

In FIG. 6 (b), the rotating ring 3 and the stationary ring 5 serving as the opposing sliding parts also relatively slide on each other as shown by arrows. However, the reversed Rayleigh step 12b is formed on the sealing faces of the rotating ring 3 and the stationary ring 5 so as to be perpendicular to the relative movement direction and facing the downstream side, and the groove section 12a serving as the negative pressure generation groove is formed on the downstream side of the reversed Rayleigh step 12b. The opposing sealing faces of the rotating ring 3 and the stationary ring 5 are flat.

When the rotating ring 3 and the stationary ring 5 are relatively moved in the directions shown by the arrows, the fluid placed between the sealing faces of the rotating ring 3 and the stationary ring 5 follows and moves in the movement direction of the rotating ring 3 or the stationary ring 5 due to the viscous property thereof. Thus, at the time, negative pressure (dynamic pressure) as shown by broken lines is generated due to existence of the reversed Rayleigh step 12b.

It should be noted that the reference signs 10a, 10b, and 10c respectively denote the inlet section, the outlet section, and the communication section of the fluid circulation groove, and the reference sign R denotes the land section.

The embodiments of the present invention are described above with the drawings. However, specific configurations are not limited to these embodiments but modifications and additions that are made within the range not departing from the gist of the present invention are also included in the present invention.

For example, although the example that the sliding parts are used for any of a pair of rotating and stationary sealing rings in a mechanical seal device is described in the above embodiments, the sliding parts can also be utilized as sliding parts of a bearing that slides on a rotating shaft while sealing lubricating oil on one side in the axial direction of a cylindrical sealing face.

In addition, for example, although the case where the high-pressure sealed fluid exists on the outer peripheral side is described in the above embodiments, the present invention can also be applied to a case where the high-pressure fluid exists on the inner peripheral side.

In addition, for example, although the case where the fluid circulation groove, the positive pressure generation mechanism, and the negative pressure generation mechanism are provided in the stationary ring of the mechanical seal that forms the sliding parts is described in the above embodiments, the fluid circulation groove, the positive pressure generation mechanism, and the negative pressure generation mechanism may be reversely provided in the rotating ring. In that case, the fluid circulation groove is not required to be provided up to the outer peripheral side of the rotating ring but only required to communicate with the sealed fluid side.

REFERENCE SIGNS LIST

1 Rotating shaft
2 Sleeve
3 Rotating ring
4 Housing
5 Stationary ring
6 Coiled wave spring
7 Bellows
10 Fluid circulation groove
11 Positive pressure generation mechanism (Rayleigh step mechanism)
12 Negative pressure generation mechanism (reversed Rayleigh step mechanism)
13 Auxiliary fluid circulation groove
14 Auxiliary positive pressure generation mechanism
15 Auxiliary positive pressure generation mechanism
16 Auxiliary positive pressure generation mechanism
R Land section

The invention claimed is:

1. A pair of sliding parts comprising sealing faces that relatively slide on each other, wherein:
   a plurality of fluid circulation grooves, each of the fluid circulation grooves including an inlet section where a fluid comes in from a high pressure fluid side, an outlet section where the fluid goes out to the high pressure fluid side, and a communication section that provides communication between the inlet section and the outlet section are provided in at least one of the sealing faces;
   wherein the plurality of fluid circulation grooves is isolated from a low pressure fluid side by a land section, and provided in the circumferential direction of the sealing face and isolated by the land section;
   a positive pressure generation mechanism is provided in a part surrounded by the fluid circulation groove and the high pressure fluid side;
   a negative pressure generation mechanism is provided on the low pressure fluid side between the plurality of fluid circulation grooves;
   an auxiliary fluid circulation groove including an inlet section where the fluid comes in from the high pressure fluid side, an outlet section where the fluid goes out to the high pressure fluid side, and a communication section that provides communication between the inlet section and the outlet section is further provided on the high pressure fluid side between the plurality of fluid circulation grooves; and
   an auxiliary positive pressure generation mechanism is provided in a part surrounded by the auxiliary fluid circulation groove and the high pressure fluid side.

2. The sliding parts as set forth in claim 1, wherein:
   the positive pressure generation mechanism is formed from a Rayleigh step mechanism; and
   a positive pressure generation groove that forms the Rayleigh step mechanism communicates with the inlet section of the fluid circulation groove, and is isolated from the communication section and the outlet section and the high pressure fluid side by a land section.

3. The sliding parts as set forth in claim 1, wherein:
   the negative pressure generation mechanism is formed from a reversed Rayleigh step mechanism; and
   a negative pressure generation groove that forms the reversed Rayleigh step mechanism communicates with the inlet section of the fluid circulation groove, and is isolated from the communication section and the outlet section and the low pressure fluid side by a land section.

4. The sliding parts as set forth in claim 1, wherein:
   the auxiliary positive pressure generation mechanism is formed from a Rayleigh step mechanism; and
   an auxiliary positive pressure generation groove that forms the Rayleigh step mechanism communicates with the inlet section of the auxiliary fluid circulation groove, and is isolated from the communication section and the outlet section of the auxiliary fluid circulation groove and the high pressure fluid side by a land section.

5. The sliding parts as set forth in claim 1, wherein:
   the auxiliary positive pressure generation mechanism is formed from a block groove mechanism;
   an auxiliary block groove that forms the block groove mechanism includes a plurality of rectangular grooves arranged in the circumferential direction;
   the rectangular groove on the upstream side communicates with the inlet section of the auxiliary fluid circulation groove and the high pressure fluid side, and is isolated from the communication section and the outlet section of the auxiliary fluid circulation groove by a land section; and
   the other rectangular grooves communicate only with the high pressure fluid side.

6. The sliding parts as set forth in claim 1, wherein:
   the auxiliary positive pressure generation mechanism is formed from a comb shaped groove mechanism; and
   an auxiliary comb shaped groove that forms the comb shaped groove mechanism is formed over the entire face of a part surrounded by the auxiliary fluid circulation groove and the high pressure fluid side excluding a plurality of rectangular land sections arranged in the circumferential direction while facing the high pressure fluid side.

7. The sliding parts as set forth in claim 2, wherein:
   the negative pressure generation mechanism is formed from a reversed Rayleigh step mechanism; and
   a negative pressure generation groove that forms the reversed Rayleigh step mechanism communicates with the inlet section of the fluid circulation groove, and is isolated from the communication section and the outlet section and the low pressure fluid side by a land section.

8. The sliding parts as set forth in claim 2, wherein:
the auxiliary positive pressure generation mechanism is formed from a Rayleigh step mechanism; and
an auxiliary positive pressure generation groove that forms the Rayleigh step mechanism communicates with the inlet section of the auxiliary fluid circulation groove, and is isolated from the communication section and the outlet section of the auxiliary fluid circulation groove and the high pressure fluid side by a land section.

9. The sliding parts as set forth in claim 2, wherein:
the auxiliary positive pressure generation mechanism is formed from a block groove mechanism;
an auxiliary block groove that forms the block groove mechanism includes a plurality of rectangular grooves arranged in the circumferential direction;
the rectangular groove on the upstream side communicates with the inlet section of the auxiliary fluid circulation groove and the high pressure fluid side, and is isolated from the communication section and the outlet section of the auxiliary fluid circulation groove by a land section; and
the other rectangular grooves communicate only with the high pressure fluid side.

10. The sliding parts as set forth in claim 2, wherein:
the auxiliary positive pressure generation mechanism is formed from a comb shaped groove mechanism; and
an auxiliary comb shaped groove that forms the comb shaped groove mechanism is formed over the entire face of a part surrounded by the auxiliary fluid circulation groove and the high pressure fluid side excluding a plurality of rectangular land sections arranged in the circumferential direction while facing the high pressure fluid side.

11. The sliding parts as set forth in claim 3, wherein:
the auxiliary positive pressure generation mechanism is formed from a Rayleigh step mechanism; and
an auxiliary positive pressure generation groove that forms the Rayleigh step mechanism communicates with the inlet section of the auxiliary fluid circulation groove, and is isolated from the communication section and the outlet section of the auxiliary fluid circulation groove and the high pressure fluid side by a land section.

12. The sliding parts as set forth in claim 3, wherein:
the auxiliary positive pressure generation mechanism is formed from a block groove mechanism;
an auxiliary block groove that forms the block groove mechanism includes a plurality of rectangular grooves arranged in the circumferential direction;
the rectangular groove on the upstream side communicates with the inlet section of the auxiliary fluid circulation groove and the high pressure fluid side, and is isolated from the communication section and the outlet section of the auxiliary fluid circulation groove by a land section; and
the other rectangular grooves communicate only with the high pressure fluid side.

13. The sliding parts as set forth in claim 3, wherein:
the auxiliary positive pressure generation mechanism is formed from a comb shaped groove mechanism; and
an auxiliary comb shaped groove that forms the comb shaped groove mechanism is formed over the entire face of a part surrounded by the auxiliary fluid circulation groove and the high pressure fluid side excluding a plurality of rectangular land sections arranged in the circumferential direction while facing the high pressure fluid side.

* * * * *